Patented Nov. 15, 1949

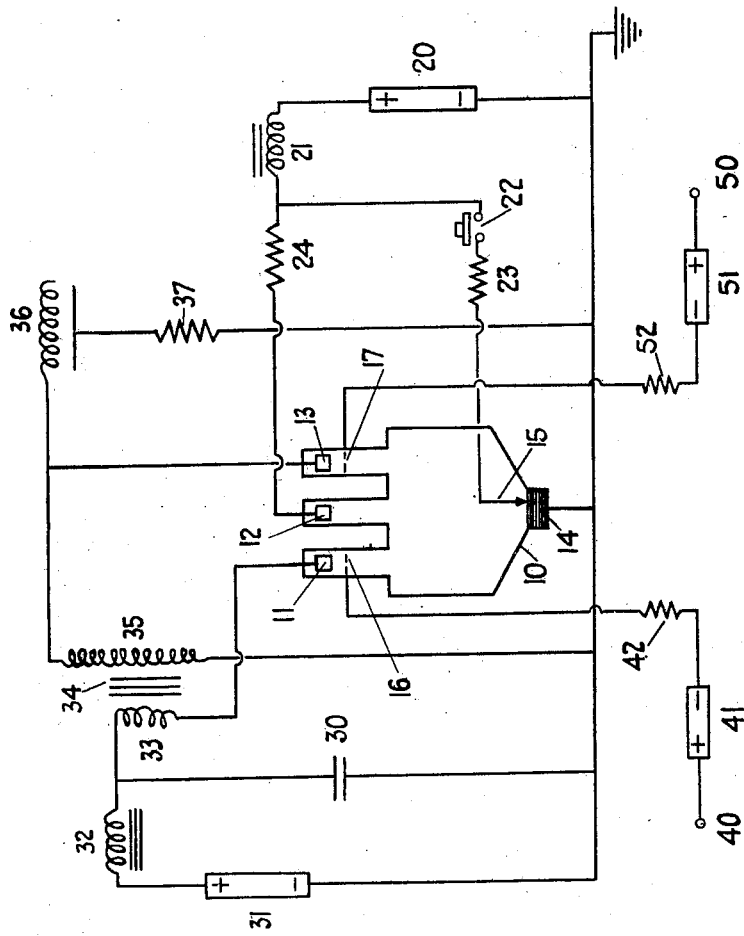

2,487,923

UNITED STATES PATENT OFFICE 2,487,923

ELECTRIC CIRCUITS, COMPRISING ELECTRIC DISCHARGE DEVICES

John McIntyre Ferguson, Stafford, England, assignor to The English Electric Company Limited, London, England, a British company Application June 22, 1948, Serial No. 34,478
In Great Britain June 24, 1947

11 Claims. (Cl. 315—137)

This invention relates to an electric circuit comprising an electric discharge device of the mercury pool cathode type. This circuit is particularly applicable for the purpose of pulse-modulation in a radar transmitter.

The electric circuit according to the invention comprises an electric discharge device having a mercury pool cathode, means to initiate an arc therefrom, and at least two anodes provided with independent control electrodes, one of said anodes being connected in series with the primary winding of a step-up transformer to discharge a capacitance therethrough, and thereby to charge to a high voltage a second capacitance connected to the secondary winding, and the second of said anodes being connected across the secondary winding to discharge the second capacitance through a load, and means to apply positive pulses to the control electrodes in rapid succession so that the arc to the second anode is established either before or shortly after that to the first anode has ceased, and to repeat these pulses so that the cycle of charge and discharge of the capacitances is repeated at high frequency.

The accompanying drawing shows a diagrammatic representation of a pulse-modulating circuit which embodies the invention in preferred form.

The mercury pool discharge device 10 has three anodes 11, 12 and 13, each in a separate anode arm, and a single mercury pool cathode 14. An igniter 15 of conventional form dips into the cathode pool.

The igniter 15, and also anode 12 which serves to provide an excitation arc, are both supplied from a D. C. source 20 through a choke 21. The supply of current between the igniter 15 and this source is controlled by push button 22 and it flows through resistor 23 which limits the current. When ignition is effected by depressing push button 22, the excitation arc from cathode pool 14 to excitation anode 12 becomes established, and the current in this arc is limited by resistor 24.

When the excitation arc has been established, an arc will occur from cathode pool 14 to anode 11 when this anode is positive and a control grid 16 in the same anode arm is given a sufficient positive pulse. Thereafter the arc between cathode pool 14 and anode 11 is sustained until the positive voltage of anode 11 relative to cathode pool 14 falls to a low value. The initiation of an arc between the cathode pool 14 and anode 13 is likewise controlled by grid 17.

Condenser 30 is charged from a direct current source 31 through a choke 32. When condenser 30 has been charged, a positive firing pulse applied between terminal 40 and earth overcomes the negative bias given by direct voltage source 41, and condenser 30 discharges through the primary winding 33 of a step-up transformer 34, and between anode 11 and cathode pool 14. The pulse of current through primary winding 33 thus produced induces a pulse of current in secondary winding 35 of transformer 34 and thereby charges an artificial line network 36 through a load represented as resistance 37. The impedance presented by artificial live network 36 is effectively a capacitance.

At a controlled delay period after the positive pulse is applied between terminal 40 and earth, another positive firing pulse is applied between terminal 50 and earth, sufficient to overcome the bias obtained from source 51 and thereby to initiate an arc between cathode pool 14 and anode 13. This arc establishes a discharge circuit for network 36 through load 37, and continues until network 36 has so far discharged that the voltage between anode 13 and cathode pool 14 is no longer sufficient to maintain an arc.

When the arc between anode 11 and cathode 14 has ceased, the charging of condenser 30 from source 31 immediately recommences and the whole cycle of operation is repeated.

The voltage of source 20 which supplies the igniter 15 and the excitation anode 12 may be 60 volts. Resistor 23 may have a value of about 10 ohms, and resistor 24 also a value about 10 ohms so that the excitation current from anode 12 is limited to about 4 amps.

Bias source 41 may have a value of about 400 volts and the positive firing pulse applied at terminal 40 may be of about 1000 volts with a duration of about 10 microseconds. Resistor 42, which limits the grid current, may have a value of 500 ohms.

Bias source 51 may have a value of about 600 volts and the positive firing pulse applied at terminal 50 may be again of about 1000 volts with a duration of about 10 microseconds. Resistor 52, which limits the grid current, may have a value of 2000 ohms. The interval between the firing pulses applied at terminals 40 and 50 may be about 300 microseconds.

In some cases it is desirable or necessary that the arc to anode 13 be started before that to anode 12 has ceased. In other cases, however, the arc to anode 13 may be started shortly after that to anode 12 has ceased, though the interval will never exceed about 100 microseconds.

The apparatus may be operated in a circuit drawing 20 amps. from a source 31 which may be of 350 volts. With a 25:1 step-up transformer ratio, voltage peaks of 20 kilovolts can be established on network 36, discharging through a load 37 of surge impedance 20 ohms giving 10 kv. pulses, 500 amps. for a 2 microseconds duration with a variable repetition frequency of 250–1000 cycles.

What I claim as my invention and desire to secure by Letters Patent is:

1. An electric circuit comprising an electric discharge device having a mercury pool cathode, means to initiate an arc therefrom, and at least two anodes provided with independent control electrodes, one of said anodes being connected in series with the primary winding of a step-up transformer to discharge a capacitance therethrough, and thereby to charge to a high voltage a second capacitance connected to the secondary winding, and the second of said anodes being connected across the secondary winding to discharge the second capacitance through a load, and means to apply positive pulses to the control electrodes in rapid succession so that the arc to the second anode is established either before or shortly after that to the first anode has ceased, and to repeat these pulses so that the cycle of charge and discharge of the capacitances is repeated at high frequency.

2. A circuit according to claim 1, wherein an additional anode is provided to serve as excitation anode.

3. A circuit according to claim 2, wherein the arc to the excitation anode is initiated at the commencement of operation by means of an igniter dipping into the mercury pool.

4. For producing very heavy current pulses of very short duration at a repetition frequency of the order of hundreds of cycles per second, an electric circuit comprising an electric discharge tube having a mercury pool cathode, a first anode provided with a first control grid, a second anode provided with a second control grid, and means to establish a continuous excitation arc in the tube; a first capacitance connected in series with a first impedance between the first anode and the cathode, a second capacitance connected in series with a second impedance between the second anode and the cathode, means to charge said capacitances at said repetition frequency, and means after said capacitances are charged to apply firing pulses to the first and second control grids at an interval of the order of hundreds of microseconds, the parameters of the circuit of the first anode being such that the discharge of the first capacitance through the first impedance initiated by the firing pulse upon the first control grid will subsist at least until the application of the firing pulse to the second control grid, and the parameters of the circuit of the second anode being such that the discharge of the second capacitance through the second impedance will produce a very heavy current pulse through the second impedance subsisting only for a period of the order of microseconds.

5. A circuit according to claim 4, wherein an additional anode is provided for the continuous excitation arc.

6. A circuit according to claim 5, wherein the arc to the excitation anode is initiated at the commencement of operation by means of an igniter dipping into the mercury pool.

7. A circuit according to claim 4 wherein the said first capacitance is charged through a choke from a direct current source.

8. For producing very heavy current pulses of very short duration at a repetition frequency of the order of hundreds of cycles per second, an electric circuit comprising an electric discharge tube having a mercury pool cathode, a first anode provided with a first control grid, a second anode provided with a second control grid, and means to establish a continuous excitation arc in the tube; a first capacitance connected in series with a first impedance between the first anode and the cathode, a second capacitance connected in series with a second impedance between the second anode and the cathode, means to charge said capacitances at said repetition frequency, and means after said capacitances are charged to apply firing pulses to the first and second control grids at an interval of the order of hundreds of microseconds, the parameters of the circuit of the first anode being such that the discharge of the first capacitance through the first impedance initiated by the firing pulse upon the first control grid will subsist until a time not more than 100 microseconds before the application of the firing pulse to the second control grid, and the parameters of the circuit of the second anode being such that the discharge of the second capacitance through the second impedance will produce a very heavy current pulse through the second impedance subsisting only for a period of the order of microseconds.

9. A circuit according to claim 8, wherein an additional anode is provided for the continuous excitation arc.

10. A circuit according to claim 9, wherein the arc to the excitation anode is initiated at the commencement of operation by means of an igniter dipping into the mercury pool.

11. A circuit according to claim 8, wherein the said first capacitance is charged through a choke from a direct current source.

JOHN McINTYRE FERGUSON.

REFERENCES CITED

The following references are of record in the file of this patent:

UNITED STATES PATENTS

| Number | Name | Date |
| --- | --- | --- |
| 2,249,819 | Gulliksen | July 22, 1941 |